US010508228B2

(12) United States Patent
Scharmach et al.

(10) Patent No.: US 10,508,228 B2
(45) Date of Patent: Dec. 17, 2019

(54) FRACTURING FLUID COMPOSITION AND METHOD UTILIZING SAME

(71) Applicants: William J Scharmach, Grand Island, NY (US); Richard M Kelly, East Amherst, NY (US)

(72) Inventors: William J Scharmach, Grand Island, NY (US); Richard M Kelly, East Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 290 days.

(21) Appl. No.: 15/260,542

(22) Filed: Sep. 9, 2016

(65) Prior Publication Data
US 2017/0073572 A1 Mar. 16, 2017

Related U.S. Application Data

(60) Provisional application No. 62/217,103, filed on Sep. 11, 2015.

(51) Int. Cl.
C09K 8/62 (2006.01)
(52) U.S. Cl.
CPC ............ C09K 8/62 (2013.01); C09K 2208/28 (2013.01)
(58) Field of Classification Search
None
See application file for complete search history.

(56) References Cited

U.S. PATENT DOCUMENTS

| 4,573,488 A | 3/1986 | Carville et al. |
| 5,045,220 A | 9/1991 | Harris et al. |
| 5,589,105 A | 12/1996 | DeSimone et al. |
| 7,726,404 B2 | 6/2010 | Kubala et al. |
| 2012/0037371 A1 | 2/2012 | Gupta et al. |
| 2014/0057813 A1* | 2/2014 | Lanctot-Downs ....... C09K 8/68 507/205 |
| 2014/0131046 A1* | 5/2014 | Al-Otaibi ................. B01J 13/16 166/305.1 |
| 2016/0075514 A1* | 3/2016 | Nazarian ................. B65G 5/00 405/54 |

FOREIGN PATENT DOCUMENTS

WO    WO-2014170455 A1 * 10/2014 ............... B65G 5/00

OTHER PUBLICATIONS

Liaw et al.; Effects of Molecular Characteristics of Polymers on Drag Reduction; AIChe Journal, vol. 17, Issue 2, pp. 391-397, Mar. 1971.
Rindfleisch et al.; Solubility of Polymers and Copolymers in Supercritical CO2; The Journal of Physical Chemistry, Sep. 1, 1996; 100(38): pp. 15581-15587.

* cited by examiner

Primary Examiner — John J Figueroa
(74) Attorney, Agent, or Firm — Iurie A. Schwartz

(57) ABSTRACT

The present disclosure is directed to a composition and method of fracturing a formation penetrated by a well-bore. The composition and method comprises providing a fracturing fluid that is carbon dioxide ($CO_2$) with at least one friction reducing polymer that is a fluoropolymer dissolved in the $CO_2$ at a concentration of about 0.001 to 0.4 weight percent.

4 Claims, 3 Drawing Sheets

FRACTURING FLUID COMPOSITION AND METHOD UTILIZING SAME

CROSS REFERENCE TO RELATED APPLICATION

This application claims the benefit of U.S. Provisional Application Ser. No. 62/217,103, filed on Sep. 11, 2015, which is incorporated herein by reference.

FIELD OF THE INVENTION

The present disclosure relates to the composition of a fluid comprising liquid carbon dioxide and a friction reducing polymer that is a fluoropolymer for the use of fracturing a subterranean formation.

BACKGROUND AND RELATED ART

Hydraulic fracturing is a common stimulation technique used to enhance production of oil and gas from hydrocarbon containing reservoirs. In a typical hydraulic fracturing operation, a fracturing fluid is pumped at high pressures and high rates through a wellbore penetrating a subterranean formation to initiate and propagate hydraulic fractures in the formation. Subsequent steps typically include adding particulate matter known as proppant to the fracturing fluid (e.g., graded sand, ceramic particles, bauxite, or resin coated sand) which is carried by the fracturing fluid into the fractures. The proppant deposits into the fractures, forming a permeable "proppant pack". Once the fracture treatment is completed, the fracture closes onto the proppant pack allowing for maintenance of the fracture, thereby providing a pathway for hydrocarbons in the formation to flow more easily into the wellbore for recovery.

The use of carbon dioxide ($CO_2$) for the production of oil and gas from a hydrocarbon containing reservoirs is well known. Utilization of carbon dioxide ($CO_2$) for the fracture treatment of oil and gas formations has certain advantages in water-sensitive and low-pressure formations. In particular, $CO_2$ enables a significant reduction in the volume of water utilized and promotes flow-back of water from the formation after fracture treatment. When exposed to aqueous based fluids, formations can trap water for long periods of time, which can result in reduced permeability to hydrocarbons and reduced productivity of the well. Additionally, some clays in the formation can swell in the presence of water or migrate through the formation resulting in closing off or blocking of porosity, again resulting in productivity impairment. Therefore, a reduction in the amount of water introduced into a well can result in decreased formation damage. Moreover, the availability of water for hydraulic fracturing may also be limited in certain geographies of interest for oil and gas production, thereby presenting an economic or regulatory barrier to practical recovery of these resources.

As mentioned above, the fracturing fluid is pumped at high pressures and rates. The pressure generated by the fracturing pumps is known as the "surface treating pressure" and is largely a function of the stress required to create the fracture in the formation, the fracturing fluid frictional pressure losses between the pumps and the formation, and the change in hydrostatic head. The surface treating pressure can be as high as 10,000 psig or more depending on the specific well requirements and pressure capability. The required fracture fluid flow rate is largely a function of the flow required to propagate the fracture and fluid leak-off into the formation. In addition, the flow rate must be sufficient to carry the proppant material (having a tendency to settle out at low flow rates), and is typically in the range 10 to 120 bpm (barrels per minute) depending on the needs of the particular well and fracture design. Wellbores commonly can extend from a few thousand feet in shallow vertical wells, to ten or twenty thousand feet or more in long-reach horizontal wells. Common well-bore casing sizes are 4½ inch and 5½ inch, through which the fracturing fluid is pumped. Tubing can also be employed, having a common nominal diameter of 2⅜ inches or 2⅞ inches, inserted through the well casing to carry the fracture fluid. This is performed, for example, when the casing is not strong enough to hold the required fluid pressure.

As can be appreciated there are often scenarios where extremely high frictional pressure drops would be incurred due to high flow rates, small casing or tubing diameters, long well bores, or combinations of these factors. To counteract high pressure drops experienced in conventional fracturing fluids, friction reducers (also commonly referred to as drag reducers) are used. These friction reducers are usually high molecular weight water-soluble polymers, which are directly added and dissolved in the aqueous fracturing fluid, and have been shown to reduce frictional pressure losses by up to about 70%.

The use of "slickwater" fracturing fluids, which employ a friction reducer in a water carrier fluid is well known in the industry. A common friction reducer used in slickwater is a high molecular weight (typically in the range 5,000,000 to 20,000,000 g/mol) polyacrylamide normally supplied as an inverse or water-in-oil emulsion. Concentrations of friction reducers employed in slickwater typically range from about 0.25 gpt (gallons per thousand) to 2 gpt. A key consideration in the design of a friction reducer system is the need to quickly dissolve the friction reducer in the fracturing fluid thereby allowing the friction reducer to become effective as soon as possible, as it is usually only a matter of seconds from the time that the friction reducer is added to when the fracturing fluid first enters the well-bore.

Limited work has been published on the use of high molecular weight polymers as friction reducers for $CO_2$. U.S. Patent Application Publication No. 2012/0037371 A1 to Gupta, et al discloses the use of polychloroprenes, vinyl acetate polymers, polyalkylene oxides and polyalphaolefins as friction reducers in a non-aqueous carrier fluid, which may further include $CO_2$. U.S. Pat. No. 4,573,488 A to Carville et al discloses the use of a homopolymer or copolymer of butylene oxide for friction reduction in non-aqueous carrier fluids.

The present invention provides fluid for the use in fracturing subterranean formations that includes a gas and a fluoropolymer employed as a friction reducer. The fluid mixture may include proppant added to the fracturing fluid. The gas component will comprise of carbon dioxide ($CO_2$) in a quantity of at least 80 wt % of the fluid composition. It has been found that by employing the fracturing fluid composition of the present invention, one or more of the following objectives can be realized:

$CO_2$ based fracture treatment fluids with reduced frictional loss characteristics can be formed and the friction reducing agents will reduce the pumping equipment and power required to treat a formation and in other cases, the friction reducing agents will enable a higher flow rate of fracturing fluid to be used to treat the formation; additionally, the methods of the present disclosure may provide reduced damage to well formations via the use of non-aqueous fracturing fluids.

Other objects and aspect of the present invention will become apparent to one of ordinary skill in the art upon review of the specification, drawings and claims appended hereto.

SUMMARY OF THE INVENTION

In accordance with one aspect of the invention, a fracturing fluid composition is provided. The fracturing fluid composition includes: (i) carbon dioxide ($CO_2$) in combination with (ii) a friction-reducing polymer in an amount of 0.001 to 0.4 weight percent of the fluid composition, wherein the friction reducing polymer has a weight average molecular weight greater than 100,000 grams per mole and comprising of at least fluoroacrylate monomers, wherein said friction reducing polymer is at least partially soluble in the $CO_2$.

DETAILED DESCRIPTION OF THE INVENTION

Figure 1:
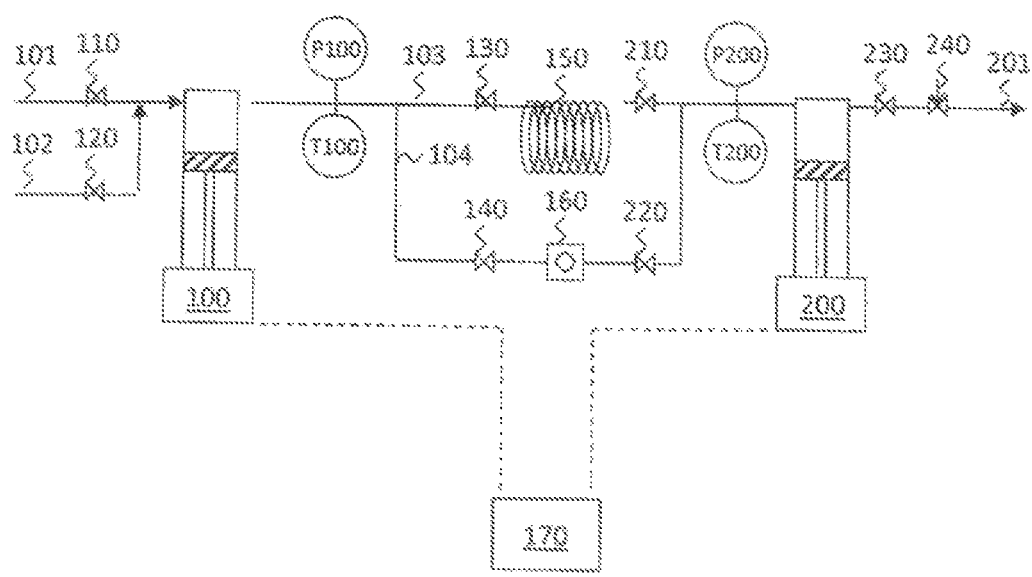
FIG. 1 is a schematic of the experimental apparatus employed to generate the results reported in Table 1 and FIG. 2.

The present invention involves the dissolution of relatively low concentrations (approximately 0.001 to 0.4 weight percent) of high molecular weight polymers into carbon dioxide ($CO_2$) to act as friction reducers in order to save pumping power at a given fracture fluid flow rate, or to enable use of a fracture fluid flow rate that would be otherwise impossible using only $CO_2$ due to an excessively high pressure drop. Much work has been conducted investigating the solubility of long chain, high molecular weight polymers in high-pressure $CO_2$ and supercritical $CO_2$ in order to increase viscosity, primarily for improved utilization of the $CO_2$ in Enhanced Oil Recovery (EOR) processes.

$CO_2$ is non-polar compound and generally a poor solvent. Short chain, low molecular weight compounds tend to be more soluble in $CO_2$ than a long chain, high molecular weight compounds. It has been previously reported that many fluorinated polymers are highly $CO_2$-philic under high-temperature and high-pressure conditions. A general conclusion was made that the solubility of a polymer or copolymer in $CO_2$ can be increased through the use of fluorinated substituents.

Friction Reducers

The friction reducers are fluoropolymers capable of reducing frictional pressure losses in a non-aqueous carrier fluid, and capable of dissolving in $CO_2$. Any reducing agent added, as needed, to the industrial gas includes, but are not limited to poly(1-,1-,dihydroperfluorooctyl acrylate) (PFOA); fluoroacrylate monomer (1-,1-,2-,2-tetrahydro heptadecafluorodecylacrylate); styrene (fluoroacrylate-styrene copolymeric) (polyFAST); fluoroacrylate-vinyl acetate copolymeric; and fluorinated polyurethane disulfate. $LCO_2$ The $CO_2$ usable for fracturing a formation is usually in liquid form, usually having a pressure in the range 2,000 to 10,000 psig, and temperature below 88° F. It is possible that at some point after the high-pressure fracture pumps that the temperature of the $CO_2$ will rise above 88° F. and the pressure will be above 1056 psig causing the $CO_2$ to exist in a supercritical state. The $CO_2$ is intended to by dry/non-aqueous and containing 5 percent water by weight or less, based on the total weight of the carrier fluid. In some cases embodiments, the fracturing fluid can contain 1 percent by weight water or less, or substantially no water.

Proppants

Proppants can be mixed with the fracturing fluids of the present application. Any suitable proppant can be employed. Proppants are generally well known for use in fracturing fluids. Examples of suitable proppant include graded sand, glass or ceramic beads or particles, bauxite grains, resin coated sand, walnut shell fragments, and combinations of the above.

Proppants are well known to be used in concentrations ranging from about 0.05 to about 14 pounds per gallon of fracturing fluid composition, but higher or lower concentrations can be used as desired for the particular fracture design.

EXAMPLES

In order to characterize the efficacy of fluoropolymers as friction reducers for $CO_2$, samples of a fluoroacrylate and styrene copolymer were combined with and $CO_2$ to form a single phase solution. Two statistical copolymers of 29 mol % styrene and 71 mol % fluoroacrylate (based on 2-(Perfluorohexyl)ethyl acrylate monomer) (also known as Poly-Fast) with a molecular weight of 200,000 g/mol and ~+500,000 g/mol and a homopolymer of 2-(Perfluorohexyl)ethyl acrylate with an estimated molecular weight of ~500,000 to 1,000,000 g/mol were evaluated for friction reduction potential. The samples were developed and prepared by the University of Pittsburgh.

Each formed solution flowed through a length of narrow diameter tubing at a room temperature of approximately 70° F., at varying rates, and the resultant pressure drops measured and compared to those observed with pure $CO_2$. Lower pressure drops in the solutions indicated a reduction in frictional pressure loss. Experimental data was used to calculate Fanning friction factors, and the reduction in Fanning friction factor relative to pure $CO_2$ was calculated and given as "Percent Friction Reduction". The purpose of the fluoropolymer is to reduce frictional pressure losses in $CO_2$. This becomes apparent as a reduction in the pressure drop measured over the length of a conduit for a fixed flow rate of fluid. As is well known in the art, the propensity of fluid for frictional pressure loss flowing in a given pipe is conveniently expressed as the Fanning friction factor as expressed in Equation 1, below, and is usually given relative to the flowing fluid's Reynolds number. Additionally, friction reduction through the use of an additive, is conveniently given by the reduction in the Fanning friction factor relative to that of the pure fluid, and herein termed "Percent Friction Reduction" and abbreviated to "FR %", as expressed in Equation 2.

$$f = \Delta P \cdot D/2 \cdot \rho \cdot V^2 \cdot L \qquad \text{Equation 1,}$$

where: f is the Fanning friction factor; $\Delta P$ is the frictional pressure drop; D is the pipe inside diameter; $\rho$ is the fluid density; V is the average fluid velocity; and L is the pipe length, all units being expressed in SI International System of Units, for consistency.

$$FR\% = 100 \times f_0 - f_1/f_0 \qquad \text{Equation 2,}$$

where: $f_0$ is the Fanning friction factor of the pure fluid, or starting fluid; $f_1$ is the Fanning friction factor of the same fluid with the addition of the friction reducer.

Example 1

The first experimental set-up and procedure is described in more detail with reference to FIG. 1 and Table 1, as follows:

The test apparatus comprised two Teledyne Isco model 500HP syringe pumps, 100 and 200, connected in fluid communication via two alternate paths: (i) a path containing a coiled, six foot length of one-sixteenth inch stainless steel tubing 150, having an inner diameter of 0.022 inches, and (ii) a path comprising quarter-inch tubing containing a 100 cc view-cell 160. The coiled section was designed to impart significant pressure drop on the flowing fluid, while the view-cell enabled visual inspection and preloading of polymer samples into the system.

The two pumps were controlled via Teledyne Isco control box 170 and were operated in such a way that fluid could be pumped from one pump to the other through coil 150 or view-cell 160 in one pass, and back again in a second pass, etc. The supplying pump (100 or 200, depending on the phase) was set up to control the fluid flow rate, and the receiving pump (200 or 100 depending on the phase) was set up to control the downstream fluid pressure.

Each experimental run was prepared by adding a predetermined mass of polymer into the view-cell 160 and sealed. Vapor and liquid $CO_2$ is provided by cylinders (not shown) located upstream of lines 101 and 102. The system is first pressurized by $CO_2$ vapor through a cylinder (not shown) connected to line 101 by opening valve 110. A portion of the gas is vented from the system by opening valves 230 and 240 to remove any air from the system, and valve 110 is then closed. The liquid is then transferred to the system through a cylinder with an installed dip tube via line 102 by opening valve 120.

Once the system is primed with liquid, valves 130 and 140 are closed. A predetermined volume of $CO_2$ is drawn into pump 100 via line 101. Pump 100 is then isolated from the source cylinder by closing valve 120 and is then used to raise the pressure of the $CO_2$ to 3,000 psig. The system pressure is brought up to 3,000 psig by opening valves 130 and 140. Valve 140 is then closed, and a portion of the liquid was then transferred from pump 100 to pump 200 via line 103 containing the pressure drop coil 150. The polymer material is then dissolved in the $CO_2$ mixture by opening valve 140 and closing valve 130, then passing the contents of pump 200 into pump 100 via line 104, then reversing the flow and passing the contents of pump 100 into pump 200. This process was repeated until a clear mixture was consistently observed via view-cell 160 indicating that the polymer was dissolved in the $CO_2$. The process was repeated by passing the fluid contents through line 103 and 104 until the polymer was uniformly dissolved in the $CO_2$ and the mixture was residing in pump 100, ready for testing.

To measure the frictional loss characteristics of the mixtures, the view-cell 160 and line 104 are isolated by closing valves 140 and 220. The fluid is then pumped from pump 100 to pump 200 through coil 150 at flow rates progressively increasing over the range 10 to 165 ml/min, with the downstream pressure controlled at 3,000 psig in each instance. At each flow rate, the fluid temperature and pressure was measured at each end of coil 150, using thermocouples T100 and T200 and pressure transducers P100 and P200. The difference in pressure readings across coil 150 was subsequently calculated to give the pressure drop for each fluid flow rate. The mid-point of pressures P100 and P200 and the mid-point of temperatures T100 and T200 were used in calculations to estimate the mean density of the fluid in coil 150 at each flow rate, and then in determining the Fanning friction factor. All of the tests were run at a room temperature of approximately 70° F. and pressures varied from a maximum of approximately 4,000 psig on the upstream side of coil 150, to the controlled value of 3,000 psig, on the downstream side of coil 150. At the end of each of these runs, the mixture was passed back to pump 200 via view cell 160, and the mixture visually checked to ensure that the polymer was completely in solution after each run (appearing as a clear liquid) or if the polymer was not completely in solution after each run (appearing as a cloudy liquid).

After each initial experimental run was completed a predetermined portion of the solution was ejected from the system via line 201, and replaced with fresh $CO_2$ via pump 100, and then thoroughly mixed according to the same method described above. This gave a new composition enriched in $CO_2$ and depleted in the polymer. When fully mixed and flowing through view-cell 160, the mixture was visually checked to see that the polymer was completely in solution. This entire dilution, mixing, visual checking, and frictional loss characterization process was repeated several times.

Figure 2:
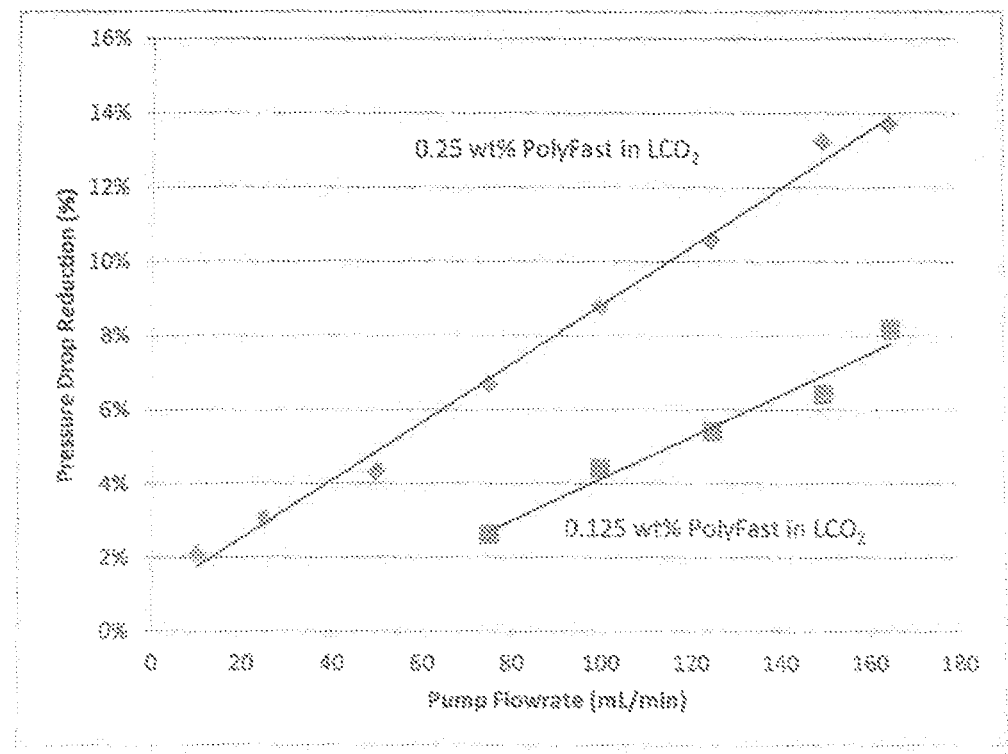
FIG. 2 is a plot of the results obtained from experiments characterizing friction reduction solution comprising $CO_2$ and fluoroacrylate-styrene copolymer (PolyFAST).

FIG. 2 provides results at a flow rate of 10 to 165 ml/min (corresponding to a mean linear velocity in coil 150 of 2.2 of 36.8 ft/sec and Reynolds numbers of 3,500 to 58,000) for two experiment where a 0.25 wt % solution of a +500,000 MW fluoroacrylate and styrene copolymer (PolyFast) sample in $CO_2$ was prepared and reduced in concentration using $CO_2$, according to the method described above, to 0.125 wt %. As shown in FIG. 2, as more $CO_2$ is added, the concentration of polymer falls and reduces the effective of drag reduction. In commercial field application it is preferred to minimize the amount of polymer added to the $CO_2$, and maximize the achievable percent friction reduction; therefore a composition of approximately 0.25 wt % of this polymer in $CO_2$ would be preferred.

Table 1, below, summarizes the results at the 100 and 150 ml/min flow rate (corresponding to a mean linear velocity in coil 150 of 22 to 33 ft/sec) for a number of experiments using 200,000 MW and 500,000 MW fluoroacrylate and styrene copolymer (PolyFast) at various polymer concentrations in $CO_2$. For each experiment conducted, the compositions, pressure drops, and percent friction reduction values are given.

TABLE 1

PolyFast Copolymer in LCO2 Data

| Experiment Number (#) | Flowrate (mL/min) | Polymer Used | Polymer Concentration (wt %) | Pressure Drop (psi) | Friction Reduction (%) |
|---|---|---|---|---|---|
| 1 | 100 | None | 0% | 317 | 0% |
| 2 | 150 | None | 0% | 684 | 0% |
| 3 | 100 | PolyFast (200,000 MW) | 0.50% | 303 | 4.4% |
| 4 | 150 | PolyFast (200,000 MW) | 0.50% | 656 | 4.1% |
| 5 | 100 | PolyFast (200,000 MW) | 0.25% | 304 | 4.1% |
| 6 | 150 | PolyFast (200,000 MW) | 0.25% | 655 | 4.1% |

TABLE 1-continued

PolyFast Copolymer in LCO2 Data

| Experiment Number (#) | Flowrate (mL/min) | Polymer Used | Polymer Concentration (wt %) | Pressure Drop (psi) | Friction Reduction (%) |
|---|---|---|---|---|---|
| 7 | 100 | PolyFast (500,000 MW) | 0.25% | 289 | 8.8% |
| 8 | 150 | PolyFast (500,000 MW) | 0.25% | 593 | 13.3% |
| 9 | 100 | PolyFast (500,000 MW) | 0.13% | 299 | 5.7% |
| 10 | 150 | PolyFast (500,000 MW) | 0.13% | 628 | 8.2% |

From the data collected in experiments 3 to 6, it can be seen that similar pressure drops and percent friction reduction values are obtained with similar concentrations. Concluding that the increase in concentration above 0.25% is not necessary for the copolymer sample of 200,000 MW. From experiments 7 to 10, it can be seen that for the optimum concentration of the polymer is approximately 0.25% (yielding 9% to 13% friction reduction as compared to pure $CO_2$) or greater. Additionally, it can be concluded from the experiments that the percent friction reduction achieved increases with polymer molecular weight and the highest weight average molecular weight is preferred.

Figure 3:
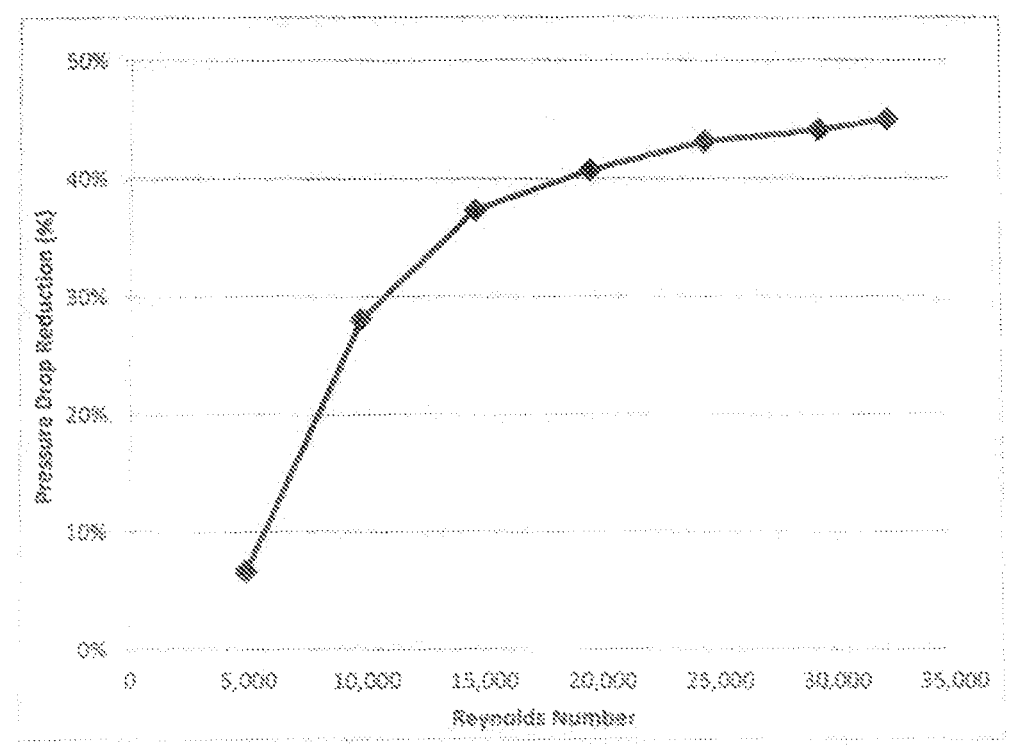
FIG. 3 is a plot of the results obtained from experiments characterizing friction reduction solution comprising $CO_2$ and fluoroacrylate homopolymer.

FIG. 3 provides friction reduction results using a 0.50 wt % solution of fluoroacrylate homopolymer sample in $CO_2$. The tested coil 150 is a slightly larger internal diameter, estimated to be around 0.0245 inches. The figure shows friction reduction benefit at Reynolds numbers between ~1,900 to ~32,000 (corresponding to a flow rate of 10 to 165 ml/min and a mean linear velocity in coil 150 of 1.8 of 29.7 ft/sec). The polymer had a varied distribution of size (and therefore molecular weight) present in the sample with the highest molecular weight contained estimated to be around ~1,000,000 g/mol.

The sample showed a maximum frictional pressure reduction of around 45% as compared to pure $CO_2$, with the benefit beginning to plateau after a Reynolds number of ~15,000. The maximum benefit shown is believed to be the result of the testing apparatus used with greater benefits possible in larger tubing systems.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims. Although various embodiments have been shown and described, the present disclosure is not so limited and will be understood to include all such modifications and variations as would be apparent to one skilled in the art.

We claim:

1. A fracturing fluid composition, comprising: (i) carbon dioxide ($CO_2$) in combination with (ii) a friction-reducing polymer in an amount of at least 0.001 to less than 0.1 weight percent of the fluid composition, wherein the friction reducing polymer has a weight average molecular weight greater than 100,000 grams per mole and comprising of at least fluoroacrylate monomers, wherein said friction reducing polymer is at least partially soluble in the $CO_2$.

2. A fracturing fluid composition of claim 1, wherein the friction reducing polymer reduces friction of said fracturing fluid at least 10% lower than that of pure carbon dioxide.

3. A fracturing fluid composition of claim 1, wherein the friction reducing polymer is a copolymer where one of the said monomers is styrene.

4. A fracturing fluid composition of claim 1, wherein the friction reducing polymer is a copolymer where one of the said monomers is vinyl acetate.

* * * * *